Figure 1:
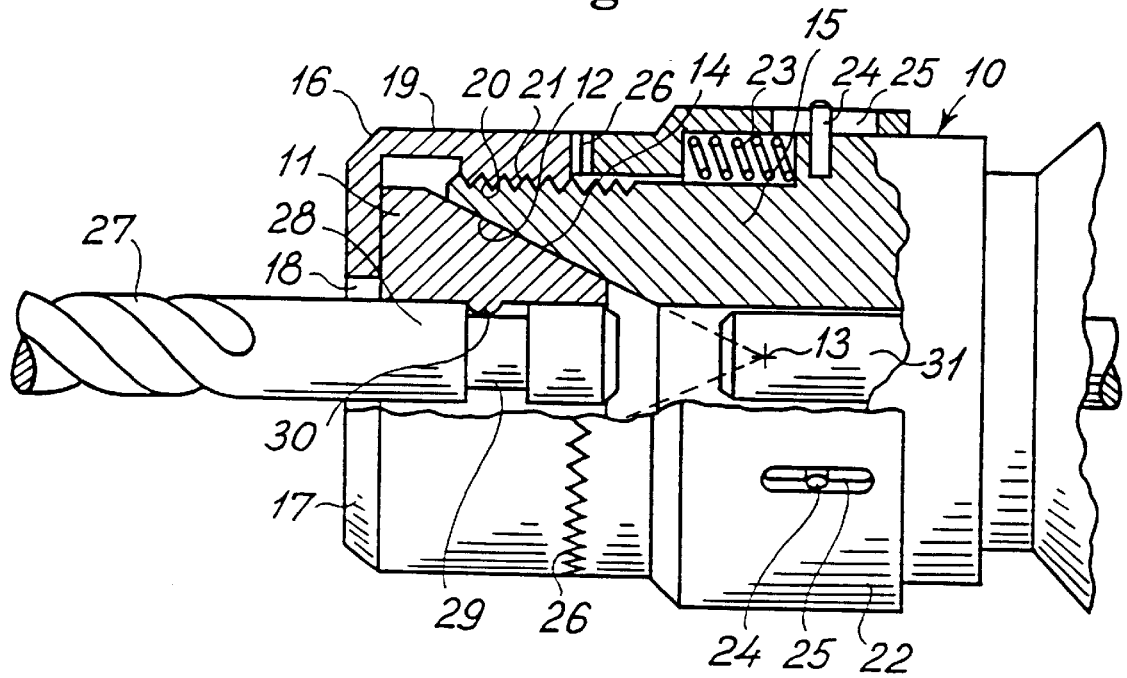

United States Patent [19]
Nielsen

[11] Patent Number: 5,833,405
[45] Date of Patent: Nov. 10, 1998

[54] COMBINATION OF A TOOL HOLDER AND A TOOL

[76] Inventor: Mogen Bjarne Nielsen, Dalvangsvej 20, DK-2600 Glostrup, Denmark

[21] Appl. No.: 648,109

[22] PCT Filed: Nov. 18, 1994

[86] PCT No.: PCT/DK94/00435

§ 371 Date: May 17, 1996

§ 102(e) Date: May 17, 1996

[87] PCT Pub. No.: WO95/13905

PCT Pub. Date: May 26, 1995

[30] Foreign Application Priority Data

Nov. 19, 1993 [DK] Denmark ................................ 1305193

[51] Int. Cl.$^6$ ........................... B23B 45/16; B23B 51/00; B23B 31/12
[52] U.S. Cl. ........................... 408/226; 279/19.3; 279/59; 408/240
[58] Field of Search .............................. 279/19–19.7, 59, 279/60, 64, 51, 53–56, 58, 75; 408/226, 240

[56] References Cited

U.S. PATENT DOCUMENTS

| | | | |
|---|---|---|---|
| 3,767,218 | 10/1973 | Linthicum et al. | 279/75 |
| 4,146,240 | 3/1979 | Nielsen. | |
| 4,232,985 | 11/1980 | Nielsen. | |
| 4,273,344 | 6/1981 | Benson et al. | 279/75 |
| 4,434,859 | 3/1984 | Rumpp et al. | 173/48 |
| 4,491,445 | 1/1985 | Hunger et al. | |
| 4,508,180 | 4/1985 | Klueber. | |
| 4,536,109 | 8/1985 | Hunger et al. | |
| 4,548,278 | 10/1985 | Gidlund. | |

FOREIGN PATENT DOCUMENTS

| | | |
|---|---|---|
| 152555 | 8/1988 | Denmark. |
| 1309742 | 10/1962 | France. |
| 36 09 911.2 | 3/1986 | Germany. |
| 43 07 050 | 9/1993 | Germany. |
| 1477021 | 6/1977 | United Kingdom. |
| 2105240 | 3/1983 | United Kingdom. |

*Primary Examiner*—Steven C. Bishop
*Attorney, Agent, or Firm*—Brinks Hofer Gilson & Lione

[57] ABSTRACT

A combination of a tool holder and a tool. A tool holder having radially movable gripping members defining an axial tool shank receiving passage therebetween. A tool having a shank portion received in the shank receiving passage of the tool holder. The gripping members and the shank portion of the tool defining cooperating male and female retainers for releasably retaining the shank portion of the tool within the shank receiving passage of the tool holder. The female retainer comprising an annular channel for receiving the male retainer therein; and the gripping members of the tool holder and the shank portion of the tool comprising cooperating first and second torque transmission surfaces, respectively, for transmitting a driving torque from the tool holder to the tool so as to rotate the same about its longitudinal axis.

28 Claims, 2 Drawing Sheets

COMBINATION OF A TOOL HOLDER AND A TOOL

The present invention relates to a new combination of a tool holder and a tool. More specifically, but not exclusively, the invention relates to a drilling tool and a holder therefor, especially a holder of the type comprising a percussion member for transmitting axial percussions to a tool received in the holder.

Thus, the present invention provides a combination comprising a tool holder having radially movable jaws or gripping members defining an axial tool shank receiving passage therebetween, and a tool having a shank portion received in the shank receiving passage of the tool holder, the jaws or gripping members and the shank portion of the tool defining cooperating male and female retaining means for releasably retaining the shank portion of the tool within the shank receiving passage of the tool holder, the female retaining means comprising an annular channel or groove for receiving the male retaining means therein.

The annular channel or groove may be formed in the outer peripheral surface of the tool shank, and radially inwardly extending male retaining means may then be formed on surfaces of the radially movable jaws or gripping members defining the shank receiving passage. Alternatively, the channel or groove opening radially inwardly may be defined in the surfaces of the jaws or gripping members defining the shank receiving passage, and the cooperating male retaining means, for example in the form of one or more axially extending projections or a peripherally extending annular collar or flange, may extend radially outwardly from the peripheral outer surface of the tool shank.

The jaws or gripping members of the tool holder and the shank portion of the tool may further comprise cooperating first and second torque transmitting surfaces, respectively, for transmitting a driving torque from the tool holder to the tool shaft so as to rotate the tool about its longitudinal axis.

The said second torque transmitting surface may be a circularly cylindrical surface of the tool shank, and in that case the jaws or gripping members may be moved into tight engagement with the cylindrical tool shaft so that frictional forces between the gripping members and the tool shaft may be used for transmitting the driving torque from the tool holder to the tool shaft.

In the preferred embodiment, however, the shank portion of the tool comprises a section having a polygonal (preferably a regular polygon) cross-section and defining substantially flat side surfaces serving as said second torque transmitting surfaces.

Preferably, the second torque transmitting surfaces comprise three substantially flat side surfaces of the tool shank being substantially parallel with the longitudinal axis of the tool shank, each adjacent pair of said three side surfaces defining an angle therebetween of about 60°. Thus, the cross-section of the tool shank may be a regular triangle or a regular hexagon.

The tool holder may comprise three gripping members or jaws defining three corresponding flat first torque transmitting surfaces which also define mutual angles of about 60°.

The tool holder may comprise an axially reciprocatable percussion member for applying axial percussions to the tool received in the tool receiving passage. In such case it is important that the tool is allowed to perform a reciprocating axial movement in relation to the gripping members or jaws of the tool holder. Therefore, the axial width of the annular channel or groove formed in the tool shaft or in the gripping members of the tool holder preferably substantially exceeds the axial extension of the male retaining means cooperating therewith.

The jaws or gripping members of the tool holder may be radially movable in any suitable manner. As an example, each jaw or gripping member may comprise a guide member being movable in a radially extending guide passage defined in the tool holder. Position adjusting means, such as screw members, may then be used for adjusting the radial position of the gripping members or jaws. However, care should be taken or means should be provided to ensure that the radial distance between the jaws or gripping members and the central axis of the tool holder is the same for all of the gripping members. All of the jaws or gripping members could be axially displaceable by means of manually operatable common adjusting means, the jaws or gripping members being guided by cam surfaces so as to be moved radially inwardly when displaced axially inwardly into the tool holder.

The cam surfaces may, for example, comprise cooperating conical surface parts having a central axis substantially coinciding with the central axis of the tool holder and the shank portion of the tool, said conical surface parts diverging axially outwardly from the tool holder. Axially outwardly directed forces or percussions which may be transmitted to the gripping members from the reciprocating tool may then efficiently be retransmitted to the tool holder body via the diverging conical surface parts.

In order to ensure that the gripping members or jaws remain in an adjusted position releasable locking means may be provided for locking the adjusting means in a desired adjusted position.

The tool holder may comprise an axially reciprocatable percussion member. If the tool received in the tool holder is of the percussive type, such as a hammer drill, the tool shank should have such a length that the inner end thereof is positioned within the stroke range of the axially outer end of the percussion member. If, however, the tool received in the tool holder is of the non-percussive type, such as a usual drill, the tool shank may have a shorter axial length so that the inner end thereof is positioned axially outside the stroke range of the percussion member when the tool shank has been mounted in the tool holder.

If the tool received in the tool holder is of the percussive type the gripping members or jaws of the tool holder should not be in tight engagement with the outer peripheral surface of the tool shank in order to allow axial reciprocating movement of the tool in relation to the tool holder. In such case, the cooperating male and female retaining means define the limit of the reciprocating movement. If, however, the tool is of the non-percussive type, the gripping members or jaws may be moved into tight engagement with the outer peripheral surface of the tool shank.

The present invention also relates to a tool holder comprising radially movable jaws or gripping members defining an axial passage therebetween for receiving a shank portion of a tool therein, the jaws or gripping members and the shank portion of the tool defining cooperating male and female retaining means for releasably retaining the shank portion of the tool within the shank receiving passage of the tool holder, the female retaining means comprising an annular channel or groove for receiving the male retaining means therein.

The invention further relates to a tool for use in a combination of a tool holder and a tool as described above and having a shank portion defining male or female retaining means for cooperating with corresponding female and male retaining means, respectively, of a tool holder, the female retaining means comprising an annular channel or groove for receiving the male retaining means therein.

Figure 2:
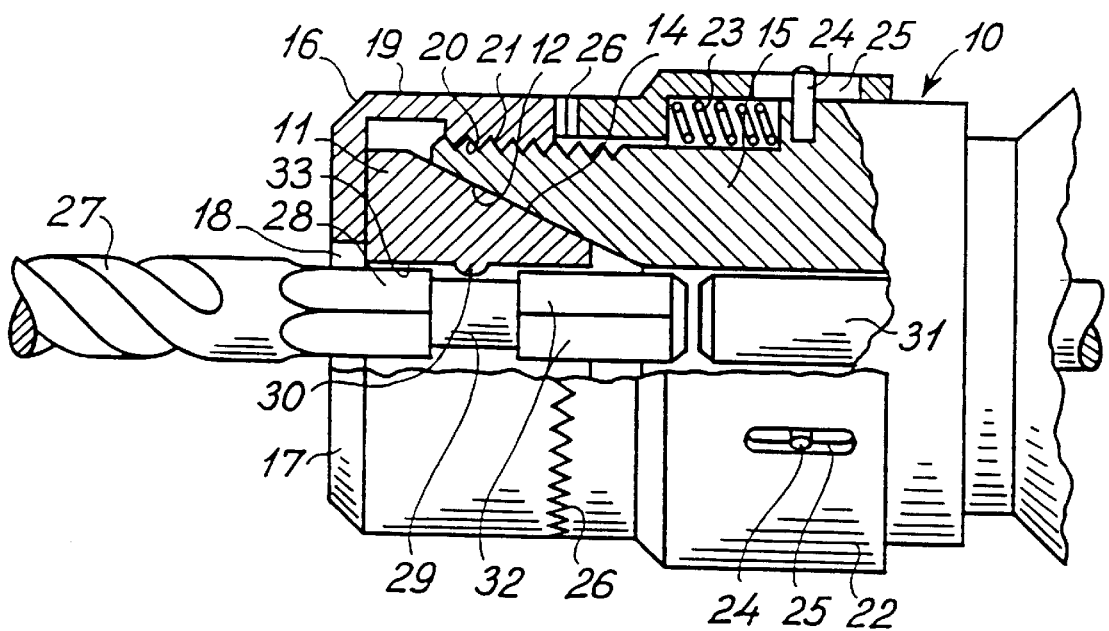
Figure 3:
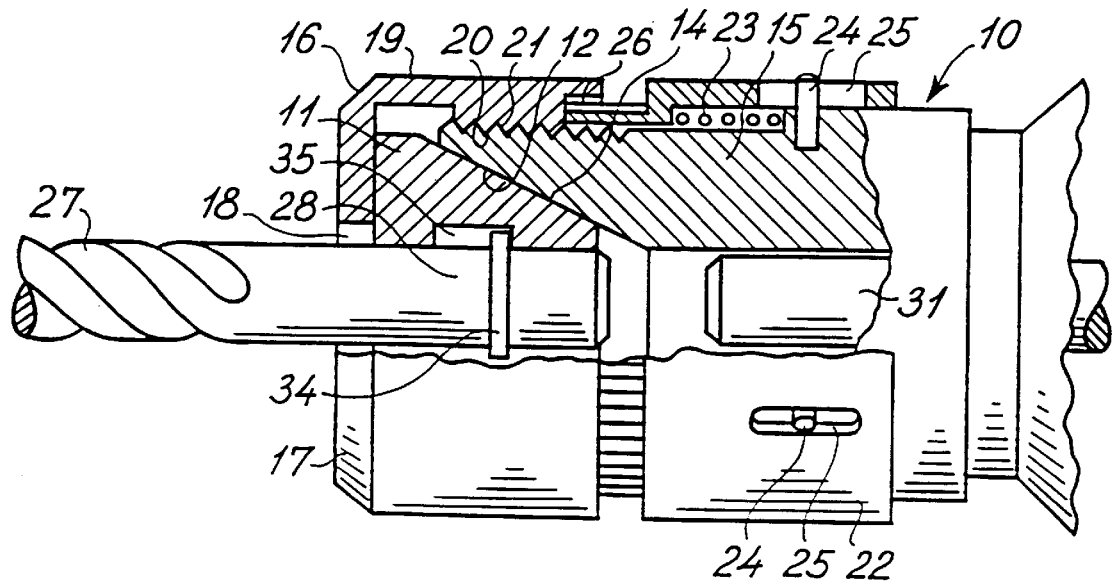
Figure 4:
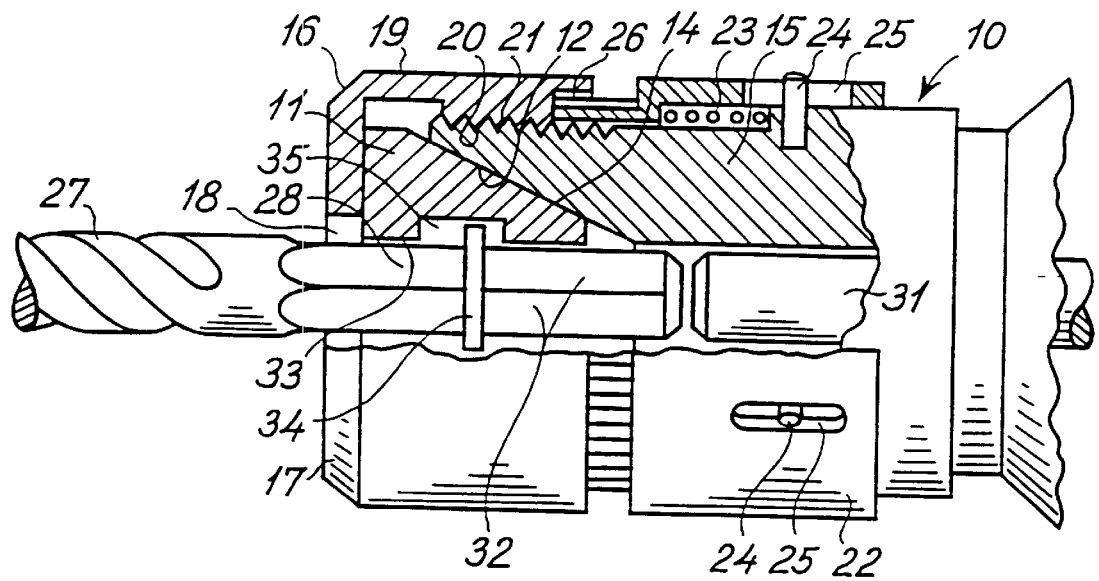

The invention will now be further described with reference to the drawings showing in side view and partially sectional view different embodiments of a combination of a tool holder and a tool according to the invention, and wherein FIG. 1 is a first embodiment of a drill holder receiving a drill of the non-percussive type, FIG. 2 is the drill holder shown in FIG. 1 receiving a drill of the percussive type, FIG. 3 is a second embodiment of the tool holder receiving a drill of the non-percussive type, and FIG. 4 is the embodiment shown in FIG. 3 receiving a drill of the percussive type.

The drawings show a drill holder or chuck 10 which may be mounted on a portable drilling machine, not shown. The drill holder comprises a number—preferably three—of gripping members or jaws in an annular arrangement. The gripping members or jaws are biassed radially outwardly by means of biassing means or springs, not shown, and each of the gripping members comprises an outer conical guide surface 12 opening axially outwardly. This means that the common apex 13 of the guide surfaces 12 is located on the longitudinal axis of the drill holder at a position spaced axially inwardly from the inner ends of the gripping members 11. Each of the conical guide surfaces 12 cooperates with a complementary conical surface 14 defined at the axially outer end of a drill holder body 15.

The gripping members or jaws 11 may be moved axially in relation to the drill holder body 15 by means of a screw cap 16. The screw cap 16 comprises an end wall 17 with a central opening 18 and a peripheral skirt 19 extending axially inwardly from the end wall 17. The inner surface of the end wall 17 is in abutting engagement with outer end surfaces of the gripping members 11 and the skirt 19 is provided with inner threads 20 which are in engagement with outer threads 21 formed on the adjacent end of the drill holder body 15.

This means that the gripping members or jaws 11 may be displaced in relation to the drill holder body 15 by rotating the screw cap 16 in one direction or the other, whereby the gripping members 11 may be moved radially inwardly or outwardly in relation to the drill holder body 15.

The screw cap or adjusting screw 16 may be locked in an adjusted position by means of a locking sleeve 22 surrounding the drill holder body 15 and being biassed in a direction towards the adjacent free end of the peripheral skirt 19 of the screw cap 16 by means of a biassing spring 23. Pin members 24 having their inner ends fastened to the drill holder body 15 extend radially outwardly into axial slots 25 which are defined in the sleeve 22. This pin/slot connection 24, 25 allows a limited axial movement of the locking sleeve 22 in relation to the drill holder body 15, but prevents rotation of the sleeve 22 in relation to the body 15. The opposite adjacent end surfaces of the skirt 19 of the screw cap or adjusting screw 16 and of the locking sleeve 22, respectively, are provided with complementary toothings or serrations 26 which are kept in mutual engagement by the spring 23, whereby the screw cap or adjusting screw 16 is locked in its adjusted position. However, by moving the locking sleeve 22 against the bias of the spring 23 the serrations 26 may be moved out of engagement so that the screw cap 16 may be rotated so as to move the gripping members or jaws 11 to a desired radial position. When the locking sleeve 22 is released the serrations 26 are moved into mutual engagement under the bias of the spring 23.

When a drill 27 is mounted in the drill holder described above the drill shank 28 is inserted through the central opening 18 into a drill receiving passage defined between the radial inner surfaces of the gripping members or jaws 11. The shanks 28 of the drills 27 shown in FIGS. 1 and 2 are provided with a peripheral, annular channel 29, which means that the drill shank has an axial section with reduced diameter spaced from the adjacent free end of the drill shank. Each of the gripping members or jaws 11 has a radially inwardly directed projection 30 which is received in the annular channel 29. The axial width of the channel or groove 29 substantially exceeds the axial extension of the projections 30 to allow axial movement of the drill shank 28 in relation to the gripping members 11.

The drill holder or chuck 10 comprises a percussion member 31 of a known type so that the drill holder or chuck 10 may be used in connection with hammer drills and other drills of the percussive type. However, FIG. 1 shows a drill 27 of a usual non-percussive type received in the drill holder. The drill shank 28 has a circularly cylindrical outer surface and has such a length that in its mounted position it does not extend into the range of operation of the reciprocating percussion member 31. This means that no percussions are transmitted from the percussion member to the drill. By rotating the screw cap or adjusting screw 16 the gripping members or jaws 11 may be moved into tight engagement with the outer cylindrical surface of the drill shank 28 so that a driving torque may be transferred from the chuck 10 to the drill 27 because of the friction between the jaws 11 and the drill shank 28.

In FIG. 2 a drill 27 of the percussive type, such as a hammer drill, is mounted in the same drill holder 10 as that shown in FIG. 1. The length of the drill shank 28 is such that the inner free end thereof is located within the range of operation of the percussion member 31 so that in operation axially directed percussions are transferred to the drill 27. Apart from the annular channel 29 the drill shank 28 has a polygonal cross-section, which may, for example, be a regular hexagon. This means that the drill shank 28 comprises flat or substantially plane driving surfaces 32, and each of the gripping members or jaws 11 may have a corresponding flat driving surface 33 on which the projection 30 is formed. In this case, the screw cap 16 is rotated so as to bring the driving surfaces 33 of the jaws 11 into loose engagement with the driving surfaces 32 of the drill shank 28 so that the drill 27 may reciprocate axially in relation to the drill holder 19 with a stroke being determined by the difference between the width of the channel 29 and the axial extension of the projections 30. This means that the same drill holder may be used for drills of the percussive as well as of the non-percussive type. Furthermore, even for hammer drills or other percussive type drills, the drill shank 28 need not have a diameter exceeding the diameter of the fluted part of the drill.

The embodiment shown in FIGS. 3 and 4 substantially corresponds to the embodiment shown in FIGS. 1 and 2. However, in FIGS. 3 and 4 the annular channel in the drill shank 28 is replaced by an annular, peripherally extending collar or bead 34, and the projections 30 on the jaws 11 are substituted by a radially inwardly opening channel section in each of the gripping members or jaws 11, which channel sections together define an annular channel 35 which may receive the collar 34 on the drill shank 28. Furthermore, in the embodiment shown in FIGS. 3 and 4 the toothings 26 comprise mutually engaging toothings or serrations formed on an outer surface part of the locking sleeve 22 and an inner surface part of the peripheral skirt 19, respectively. While the embodiment shown in FIGS. 1 and 2 comprises two or more coil springs or biassing springs 23 spaced around the periphery of the drill holder 10 the embodiment shown in FIGS. 3 and 4 has a single coil spring 23 surrounding the drill holder body 15. In other respects the embodiment according to FIGS. 3 and 4 functions as described above with reference to FIGS. 1 and 2.

It should be understood that various changes and modifications of the embodiments described above may be made within the scope of the present invention. As an example, the collar or bead 34 formed on the drill shanks 28 shown in FIGS. 3 and 4 could be replaced by a number of peripherally spaced projections in an annular arrangement.

I claim:

1. A combination comprising
   a tool holder having radially movable gripping members defining an axial tool shank receiving passage therebetween, and
   a tool having a shank portion received in the shank receiving passage of the tool holder,
   the gripping members of the tool holder and the shank portion of the tool defining cooperating male and female retainers for releasably retaining the shank portion of the tool within the shank receiving passage of the tool holder, the female retainer comprising an annular channel for receiving the male retainer therein; and
   the gripping members of the tool holder and the shank portion of the tool further defining cooperating first and second torque transmission surfaces, respectively, positioned adjacent to the male and female retainers for transmitting a driving torque from the tool holder to the tool so as to rotate the same about its longitudinal axis.

2. A combination according to claim 1, wherein the tool shank portion of the tool has a substantially circularly cylindrical surface defining the second torque transmitting surface.

3. A combination according to claim 1, wherein the shank portion of the tool comprises a section having a polygonal cross-section and defining substantially flat side surfaces serving as said second torque transmitting surfaces.

4. A combination according to claim 3, wherein the second torque transmitting surfaces comprise three substantially flat side surfaces of the shank portion of the tool, said side surfaces being substantially parallel with the longitudinal axis of the shank portion of the tool, each adjacent pair of said three side surfaces defining an angle therebetween of about 60°.

5. A combination according to claim 1, wherein one of the male and female retainers is formed on said first torque transmitting surfaces.

6. A combination according to claim 1, wherein the annular channel defines an axial width substantially exceeding an axial extension of the male retainer cooperating therewith.

7. A combination according to claim 1, wherein the radially moveable gripping members of the tool holder are axially displaceable by means of manually operatable adjusting means, the gripping members being guided by cam surfaces so as to be moved radially inwardly when displaced axially inwardly into the tool holder.

8. A combination according to claim 7, wherein said cam surfaces comprise cooperating conical surface parts having a central axis substantially coinciding with the central axis of the tool holder and the shank portion of the tool, said conical surface parts diverging axially outwardly from the tool holder.

9. A combination according to claim 7, further comprising releasable locking means for locking the adjusting means in a desired adjusted position.

10. A combination according to claim 1, wherein the tool holder comprises an axially reciprocatable percussion member, the shank portion of the tool comprising an inner end positioned within a stroke range of an axially outer end of the percussion member.

11. A combination according to claim 1, wherein the tool holder comprises an axially reciprocatable percussion member, the shank portion of the tool comprising an inner end positioned axially outside a stroke range of an axially outer end of the percussion member.

12. A combination according to claim 1, wherein the tool comprises a drilling tool and the tool holder comprises a chuck of a portable drilling machine.

13. A tool holder comprising radially movable gripping members defining an axial shank receiving passage therebetween for receiving a shank portion of a tool therein, the gripping members and the shank portion of the tool defining cooperating male and female retainers for releasably retaining the shank portion of the tool within the shank receiving passage of the tool holder, the female retainer comprising an annular channel for receiving the male retainer therein; and
   the gripping members of the tool holder further defining first torque transmitting surfaces positioned adjacent to the male and female retainers for transmitting a driving torque from the tool holder to a shank portion of a tool received therein.

14. A tool holder according to claim 13, wherein the radially movable gripping members are axially displaceable by means of manually operatable adjusting means, the gripping members being guided by cam surfaces so as to be moved radially inwardly into the tool holder.

15. A tool holder according to claim 14, wherein the cam surfaces comprise cooperating conical surface parts having a central axis substantially coinciding with the central axis of the tool holder, said conical surface parts diverging axially outwardly from the tool holder.

16. A tool holder according to claim 14, further comprising releasable locking means for locking the adjusting means in a desired adjusted position.

17. A tool holder according to claim 13, further comprising an axially reciprocatable percussion member.

18. A tool holder according to claim 13, wherein the tool holder comprises a chuck and is adapted to be mounted on a portable drilling machine.

19. A tool holder comprising three radially movable gripping members defining an axial shank receiving passage therebetween for receiving a shank portion of a tool therein, the gripping members and the shank portion of the tool defining cooperating male and female retainers for releasably retaining the shank portion of the tool within the shank receiving passage of the tool holder, the female retainer comprising an annular channel for receiving the male retainer therein; and
   each of the gripping members of the tool holder defining a substantially flat first torque transmitting surface for transmitting a driving torque from the tool holder to a shank portion of a tool received therein, and said first torque transmitting surface defining said shank receiving passage of said tool holder.

20. A tool holder according to claim 13 or 19, wherein one of the male and female retainers is formed on said first torque transmitting surfaces.

21. A tool for use in a tool holder, said tool comprising a shank portion defining a male retainer for cooperating with a corresponding female retainer of the tool holder, the female retainer comprising an annular channel for receiving the male retainer therein; and the shank portion of the tool comprising a section having a polygonal cross-section and defining substantially flat side surfaces serving as torque transmitting surfaces positioned immediately adjacent to the male retainer defined by the shank portion for cooperating with torque transmitting surfaces formed on radially movable gripping members of the tool holder.

22. A tool according to claim 21, wherein the shank portion of the tool comprises the male retainer in the form of a peripheral, radially extending, annular flange.

23. A tool according to claim 21, wherein the torque transmitting surfaces comprise three substantially flat side surfaces of the shank portion of the tool, said side surfaces being substantially parallel with the longitudinal axis of the shank portion of the tool, each adjacent pair of said three side surfaces defining an angle therebetween of about 60°.

24. A tool according to claim 21, wherein the torque transmitting surfaces of the shank define a polygonal cross-section.

25. A tool according to claim 21, wherein the tool comprises a drilling tool.

26. A combination comprising:

a tool holder having three radially movable gripping members defining an axial tool shank receiving passage therebetween, and a tool having a shank portion received in the shank receiving passage of the tool holder, the gripping members and the shank portion of the tool defining cooperating male and female retainers for releasably retaining the shank portion of the tool within the shank receiving passage of the tool holder, the female retainer comprising an annular channel for receiving the male retainer therein;

each of the gripping members defining a substantially flat first torque transmitting surface, said first torque transmitting surfaces defining the shank receiving passage of the tool holder; and the shank portion of the tool comprising second torque transmission surfaces that cooperate with said first torque transmitting surfaces for transmitting a driving torque from the tool holder to the tool so as to rotate the same about its longitudinal axis.

27. A combination comprising a tool holder having radially movable gripping members defining an axial tool shank receiving passage therebetween, and a tool having a shank portion received in the shank receiving passage of the tool holder, the gripping members and the shank portion of the tool defining cooperating male and female retainers for releasably retaining the shank portion of the tool within the shank receiving passage of the tool holder, the female retainer comprising an annular channel for receiving the male retainer therein;

the gripping members of the tool holder and the shank portion of the tool comprising cooperating first and second torque transmission surfaces, respectively, for transmitting a driving torque from the tool holder to the tool so as to rotate the same about its longitudinal axis; and wherein the female retainer is defined by inner surfaces of the tool holder defining the shank receiving passage, the annular channel having an axial width substantially exceeding an axial extension of the cooperating male retainer formed on the shank portion of the tool to be received in the shank receiving passage.

28. A tool holder comprising radially movable gripping members defining an axial shank receiving passage therebetween for receiving a shank portion of a tool therein, the gripping members and the shank portion of the tool defining cooperating male and female retainers for releasably retaining the shank portion of the tool within the shank receiving passage of the tool holder, the female retainer comprising an annular channel for receiving the male retainer therein;

the gripping members of the tool holder comprising first torque transmitting surfaces for transmitting a driving torque from the tool holder to a shank portion of a tool received therein; and wherein the female retainer is defined by inner surfaces of the tool holder defining the shank receiving passage, the female retainer comprising an annular channel having an axial width substantially exceeding an axial extension of the cooperating male retainer formed on the shank portion of the tool to be received in the shank receiving passage.

* * * * *